United States Patent
Zhang et al.

(10) Patent No.: US 11,070,754 B1
(45) Date of Patent: Jul. 20, 2021

(54) SLEW RATE CONTROL CIRCUIT FOR AN IMAGE SENSOR

(71) Applicants: STMicroelectronics Asia Pacific Pte Ltd., Singapore (SG); STMicroelectronics (Alps) SAS, Grenoble (FR)

(72) Inventors: Hongliang Zhang, Singapore (SG); Lookah Chua, Singapore (SG); Celine Mas, Poisat (FR); Wai Yin Hnin, Singapore (SG)

(73) Assignees: STMicroelectronics Asia Pacific Pte Ltd., Singapore (SG); STMicroelectronics (Alps) SAS, Grenoble (FR)

( * ) Notice: Subject to any disclaimer, the term of this patent is extended or adjusted under 35 U.S.C. 154(b) by 0 days.

(21) Appl. No.: 16/828,423

(22) Filed: Mar. 24, 2020

(51) Int. Cl.
*H04N 5/225* (2006.01)
*H04N 5/359* (2011.01)
*H04N 5/374* (2011.01)

(52) U.S. Cl.
CPC .......... *H04N 5/3597* (2013.01); *H04N 5/374* (2013.01)

(58) Field of Classification Search
None
See application file for complete search history.

(56) References Cited

U.S. PATENT DOCUMENTS

| | | | |
|---|---|---|---|
| 6,573,777 B2 * | 6/2003 | Saint-Laurent | H03H 11/265 327/270 |
| 7,732,748 B2 | 6/2010 | Johansson | |
| 8,149,311 B2 | 4/2012 | Yu | |
| 8,841,595 B2 | 9/2014 | Storm et al. | |
| 9,100,605 B2 | 8/2015 | Raynor | |
| 9,667,234 B1 | 5/2017 | Milkov et al. | |
| 9,881,968 B2 | 1/2018 | Storm et al. | |
| 10,277,856 B2 | 4/2019 | Okura et al. | |
| 2005/0219876 A1 * | 10/2005 | Yan | H04N 5/335 363/59 |

(Continued)

OTHER PUBLICATIONS

De Wit, Yannick et al., "A Low Noise Low Power Global Shutter CMOS Pixel Having Single readout capability and Good Shutter Efficiency", International Image Sensor Workshop, Session 12: Global Shutter Sensors, Jun. 11, 2011, pp. 312-315.

(Continued)

*Primary Examiner* — Twyler L Haskins
*Assistant Examiner* — Dwight Alex C Tejano
(74) *Attorney, Agent, or Firm* — Slater Matsil, LLP

(57) ABSTRACT

In an embodiment, an image sensor includes: first and second voltage rails; first and second regulators configured to generate first and second regulated voltage at the first and second voltage rails, respectively; and a plurality of pixels coupled to the first and second voltage rails. Each pixel includes: first and second transistor coupled first and second storage capacitor, respectively. A third transistor is coupled between a control terminal of the first transistor and the first or second voltage rails. The third transistor is configured to limit a slew rate of current flowing between the control terminal of the second transistor and the first or second voltage rails to a first slew rate when the image sensor operates in global shutter mode, and to a second slew rate when the image sensor operates in rolling mode, the first slew rate being smaller than the second slew rate.

20 Claims, 8 Drawing Sheets

(56) References Cited

U.S. PATENT DOCUMENTS

| | | | |
|---|---|---|---|
| 2006/0006915 A1* | 1/2006 | Yan | H04N 5/3597 327/175 |
| 2012/0006973 A1 | 1/2012 | Storm et al. | |
| 2014/0008520 A1* | 1/2014 | Raynor | H04N 5/3535 250/208.1 |
| 2016/0088251 A1* | 3/2016 | Luo | H04N 5/37452 250/208.1 |
| 2016/0155773 A1* | 6/2016 | Storm | H04N 5/355 257/225 |
| 2017/0187936 A1* | 6/2017 | Raynor | H04N 5/37452 |
| 2020/0036923 A1* | 1/2020 | Goto | H04N 5/3765 |
| 2020/0195863 A1* | 6/2020 | Shim | H04N 5/374 |

OTHER PUBLICATIONS

Dipti, et al., "Optimized Design of Active Pixel Sensor using CMOS 180 nm Technology", IJARCCE, International Journal of Advanced Research in Computer and Communication Engineering, vol. 5, Issue 7, Jul. 2016, 4 pages.

El Gamal, Abbas et al., "CMOS Image Sensors Lecture Notes 4", EE 392B; Network Information Theory, Stanford University, U.S., Jan. 20, 2010, published by Cambridge, 54 pages.

El-Desouki, Munir et al., "CMOS Image Sensors for High Speed Applications", Sensors, ISSN 1424-8220, www.mdpi.com/journal/sensors, vol. 9, Jan. 13, 2009, pp. 430-444.

Lauxtermann, Stefan et al., "Comparison of Global Shutter Pixels for CMOS Image Sensors", ResearchGate, Jan. 2007, 4 pages.

Lillestol, Marius Lunder, "Design and test of a CMOS image sensor with global shutter and High Dynamic Range", University of Oslo, Spring 2017, 97 pages.

Meynants, G., et al., "Limitations to the frame rate of high speed image sensors", Proc. Int. Image Sensor Workshop, Jun. 2009, 4 pages.

Moutafis, Konstantinos "A Highly-Sensitive Global-Shutter CMOS Image Sensor with on-Chip Memory for hundreds of kilo-frames per second scientific experiments", National Technical University of Athens, Dec. 2019, 156 pages.

Perez-Bailon, Jorge et al., "A 0.18 um CMOS LDO Regulator for an On-Chip Sensor Array Impedance Measurement System", Sensors, MDPI, May 2, 2018, 17 pages.

Wikipedia, "Active-pixel sensor", https://en.wikipedia.org/wiki/Active-pixel_sensor, printed Feb. 21, 2020, printed Feb. 21, 2020, 13 pages.

* cited by examiner

PRIOR ART

SLEW RATE CONTROL CIRCUIT FOR AN IMAGE SENSOR

TECHNICAL FIELD

The present disclosure relates generally to an electronic system and method, and, in particular embodiments, to a slew rate control circuit for an image sensor.

BACKGROUND

Image sensors detect and convey information of an image. Image sensors may be implemented with CMOS sensors. A conventional CMOS sensor includes a plurality of CMOS active pixel sensor (APS) structures, which may be implemented with a pinned photodiode. For example, as shown in FIG. 1, a CMOS APS pixel 100 may be implemented with pinned photodiode 102, reset transistor 104, selection transistor 108, and source-follower transistor 106. Pinned photodiode 102 may be enabled or disabled by applying a voltage to a control terminal of pinned photodiode 102 (not shown).

During normal operation, reset transistor 104 is reset to set the voltage at the gate of transistor 106 to $V_{RST}$ (where $V_{RST}$ may be the same as $V_{DD}$), thereby clearing the integrated charge of photodiode 102. When reset transistor 104 is turned off, the voltage of the photodiode, which is based on the intensity of light that photodiode 102 receives, is buffered by source-follower transistor 106 and can be read in the column bus COL when selection transistor 108 is turned on.

Some image sensor may operate in rolling shutter mode, in which an image is captured by scanning the scene row by row or column by column and by reading the captured scene also row by row or column by column. In other words, the rows (or columns) sequentially integrate and sample the image. In contrast with the rolling shutter mode, some image sensor may operate in global shutter mode, in which all pixels of the image sensor are integrated and sampled simultaneously, thereby capturing the entire image at the same instant, the image restitution operates still in scanning mode row by row or column by column during readout phase.

SUMMARY

In accordance with an embodiment, an image sensor includes: first and second voltage rails; a first regulator having an output coupled to the first voltage rail and configured to generate a first regulated voltage; a second regulator having an output coupled to the second voltage rail and configured to generate a second regulated voltage lower than the first regulated voltage; and a plurality of pixels coupled to the first and second voltage rails. Each pixel of the plurality of pixels includes: first and second storage capacitors, a first transistor having a current path coupled to the first storage capacitor, a second transistor having a current path coupled to the second storage capacitor, and a third transistor coupled between a control terminal of the first transistor and the first or second voltage rails. The third transistor is configured to limit a slew rate of current flowing between the control terminal of the second transistor and the first or second voltage rails to a first slew rate when the image sensor operates in global shutter mode, and to a second slew rate when the image sensor operates in rolling mode, the first slew rate being smaller than the second slew rate.

In accordance with an embodiment, a method includes: generating a first voltage at a first voltage rail that is coupled to a plurality of pixels of an image sensor; generating a second voltage at a second voltage rail that is coupled to the plurality of pixels, where the second voltage is different than the first voltage; transitioning a first signal at a control terminal of a first transistor from the first voltage to the second voltage, where the first transistor has a current path coupled to a first storage capacitor; after transitioning the first signal from the first voltage to the second voltage, transitioning a second signal at a control terminal of a second transistor from the first voltage to the second voltage, where the second transistor has a current path coupled to a second storage capacitor; after transitioning the second signal from the first voltage to the second voltage, transitioning the second signal from the second voltage to the first voltage; and during the transition of the second signal from the second voltage to the first voltage, limit a slew rate of a current flowing between the control terminal of the first or second transistor and the first voltage rail to a first slew rate when the image sensor is in global shutter mode, and to a second slew rate when the image sensor is in rolling mode, where the first slew rate is smaller than the second slew rate.

In accordance with an embodiment, an integrated circuit includes: a first internal LDO configured to generate a first regulated voltage at a first voltage rail, where the first internal LDO is not coupled to a compensation capacitor external to the integrated circuit; a second internal LDO configured to generate a second regulated voltage at a second voltage rail, where the second internal LDO is not coupled to a compensation capacitor external to the integrated circuit, and where the second regulated voltage is lower than the first regulated voltage; and an image sensor including a plurality of image sensor pixels arranged in rows and columns and coupled to the first and second voltage rails, where each image sensor pixel of the plurality of image sensor pixels includes: first and second storage capacitors, a first transistor having a current path coupled to the first storage capacitor, a second transistor having a current path coupled to the second storage capacitor, and a third transistor coupled between a control terminal of the first transistor and the second voltage rail, where the third transistor is configured to limit a slew rate of current flowing between the control terminal of the first transistor and the second voltage rail to a first slew rate when the image sensor operates in global shutter mode, and to a second slew rate when the image sensor operates in rolling mode, the first slew rate being smaller than the second slew rate.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a slew rate control circuit for a CMOS image sensor that operates in global shutter mode and rolling mode and with shared regulators. Some embodiments may be used in other circuits, e.g., that could benefit from combining regulators. Some embodiments may be used in imaging applications, such as photography, face recognition, and automotive applications, for example.

In an embodiment of the present invention, a first internal regulator generating a high voltage rail and a second internal regulator generating low voltage rail are shared across all pixels of a CMOS image sensor. Spikes that may be generated in the high voltage rail or in the low voltage rail are suppressed by a slew rate control circuit that is configurable based on whether the CMOS image sensor is operating in global shutter mode or in rolling mode.

Figure 1:
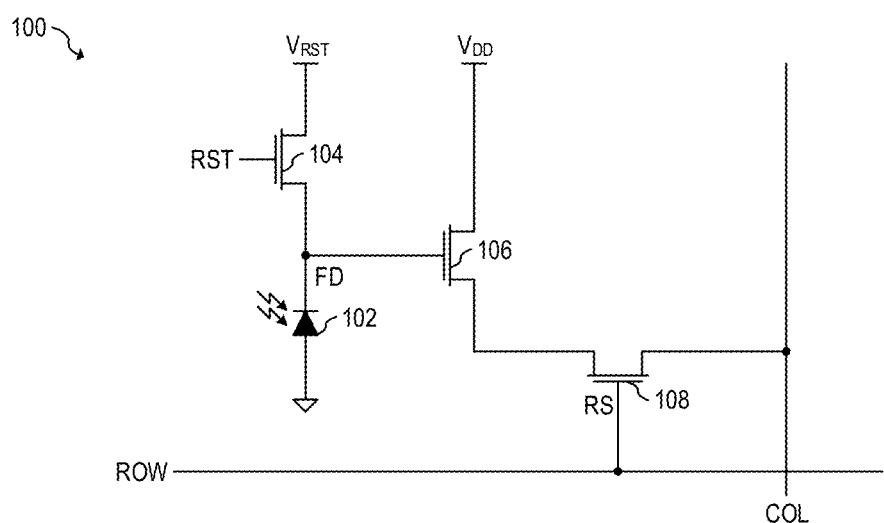
FIG. 1 shows a schematic diagram of an exemplary CMOS sensor pixel.
Figure 2A:
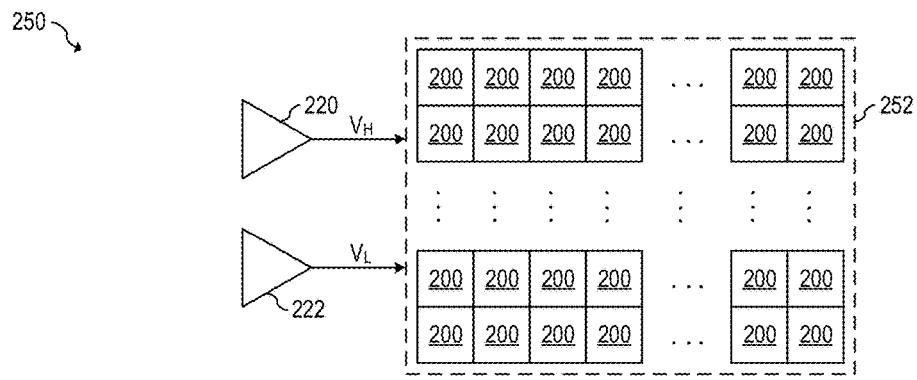
FIGS. 2A and 2B show schematic diagrams of a CMOS image sensor, and a pixel of the CMOS image sensor, respectively, according to an embodiment of the present invention.
Figure 2B:
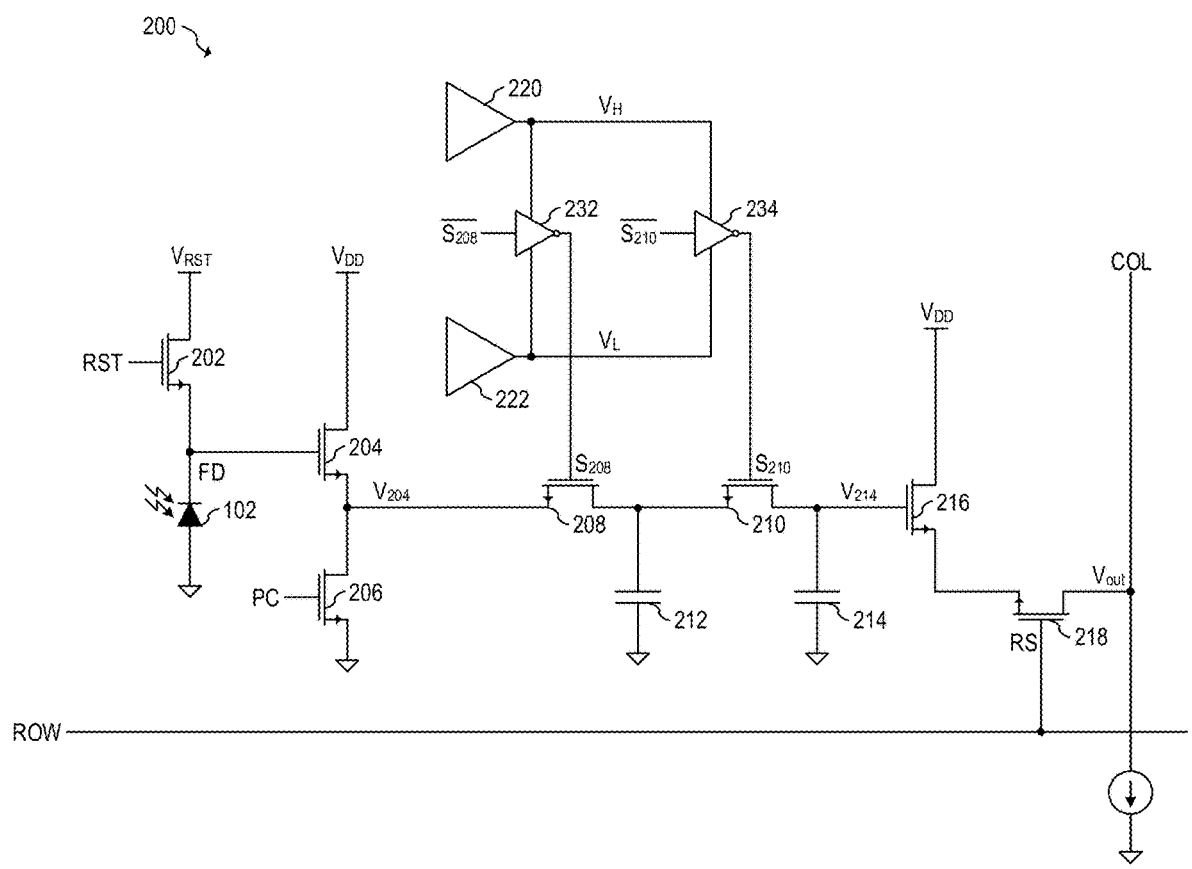

FIGS. 2A and 2B show schematic diagrams of CMOS image sensor 250, and pixel 200, respectively, according to an embodiment of the present invention. As shown in FIG. 2A, CMOS image sensor 250 includes CMOS sensor array 252, which includes a plurality of CMOS pixels 200 arranged in rows and columns. CMOS image sensor 250 also includes internal regulators 220 and 222. As will be described later in more detail, internal regulators 220 and 222 are shared across all pixels 200 of CMOS image sensor 250. In some embodiments, CMOS image sensor 250 may be implemented in a monolithic substrate inside an integrated circuit (IC).

As shown in FIG. 2B, each pixel 200 includes pinned photodiode 102, reset transistor 202, selection transistor 218, source-follower transistor 204, storage control transistors 206, 208 and 210, storage capacitors 212 and 214, and gate drivers 232 and 234. Pinned photodiode 102 may be enabled or disabled by applying a voltage to a control terminal of pinned photodiode 102 (not shown).

During normal operation, reset transistor 104 is reset to set the voltage at the gate of transistor 204 to $V_{RST}$ (where $V_{RST}$ may be, e.g., the same as $V_{DD}$), thereby clearing the integrated charge of photodiode 102. When reset transistor 104 is turned off and photodiode 102 is enabled, the voltage at node FD, which is based on the intensity of light that photodiode 102 receives (integrated over time), is buffered by source-follower transistor 204 to node $V_{204}$. Node $V_{204}$ is sampled by switching storage control transistors 208 and 210 so as to store voltage $V_{204}$ into storage capacitors 212 and 214. The stored voltage $V_{214}$ is transferred to $V_{out}$ through source follower 216 when the pixel is selected for readout at the column bus COL (by turning on transistor 218). Reading the output voltage $V_{out}$, and thereby the intensity of light received by photodiode 102, is performed in a known manner.

Gate drivers 232 and 234 generate signals $S_{208}$ and $S_{210}$, respectively, to control storage control transistors 208 and 210. As shown in FIG. 2B, signals $S_{208}$ and $S_{210}$ can have a low voltage $V_L$ or a high voltage $V_H$. As a non-limiting example, in some embodiments, low voltage $V_L$ and high voltage $V_H$ are, e.g., 0.4 V and 3.3 V respectively. Other voltages may be used.

In some embodiments, as shown in FIG. 2B, gate drivers 232 and 234 may operate as inverters. In other embodiments, gate drivers 232 and 234 may operate as buffers or level shifter.

Voltages $V_H$ and $V_L$ are generated by shared internal regulators 220 and 222, respectively. Internal regulators 220 and 222 may be implemented, e.g., as LDOs without an external compensation capacitor (external to the IC of CMOS image sensor 250).

In some image sensors, it may be advantageous to limit the number of LDOs, e.g., to reduce power consumption. In some embodiments, sharing regulators 220 and 222 over gate drivers 232 and 234 of all pixels of CMOS image sensor 250 advantageously minimizes power consumption of the CMOS image sensor when compared to using two dedicated regulators for all gate drivers 232 and two additional dedicated regulators for all gate drivers 234.

Figure 3:
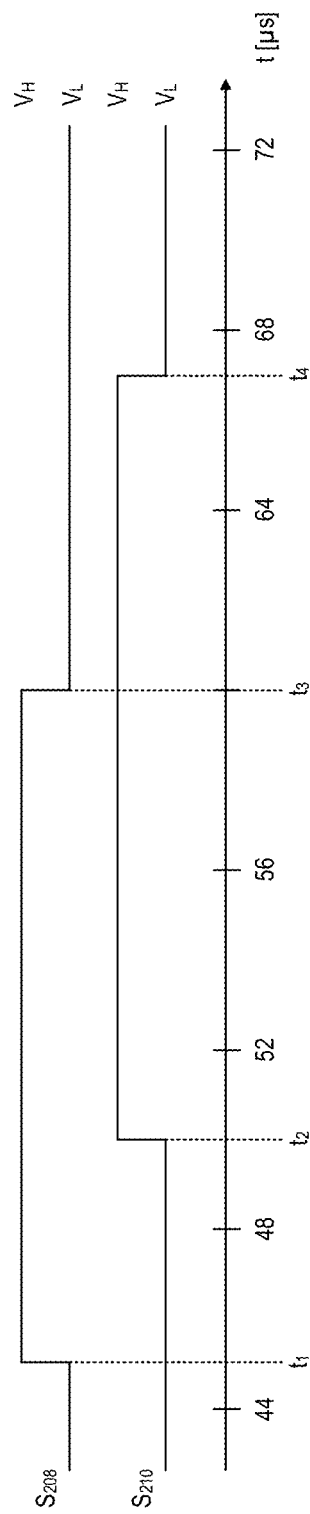
FIG. 3 shows waveforms of signals of the pixel of FIG. 2B, according to an embodiment of the present invention.
Figure 4:
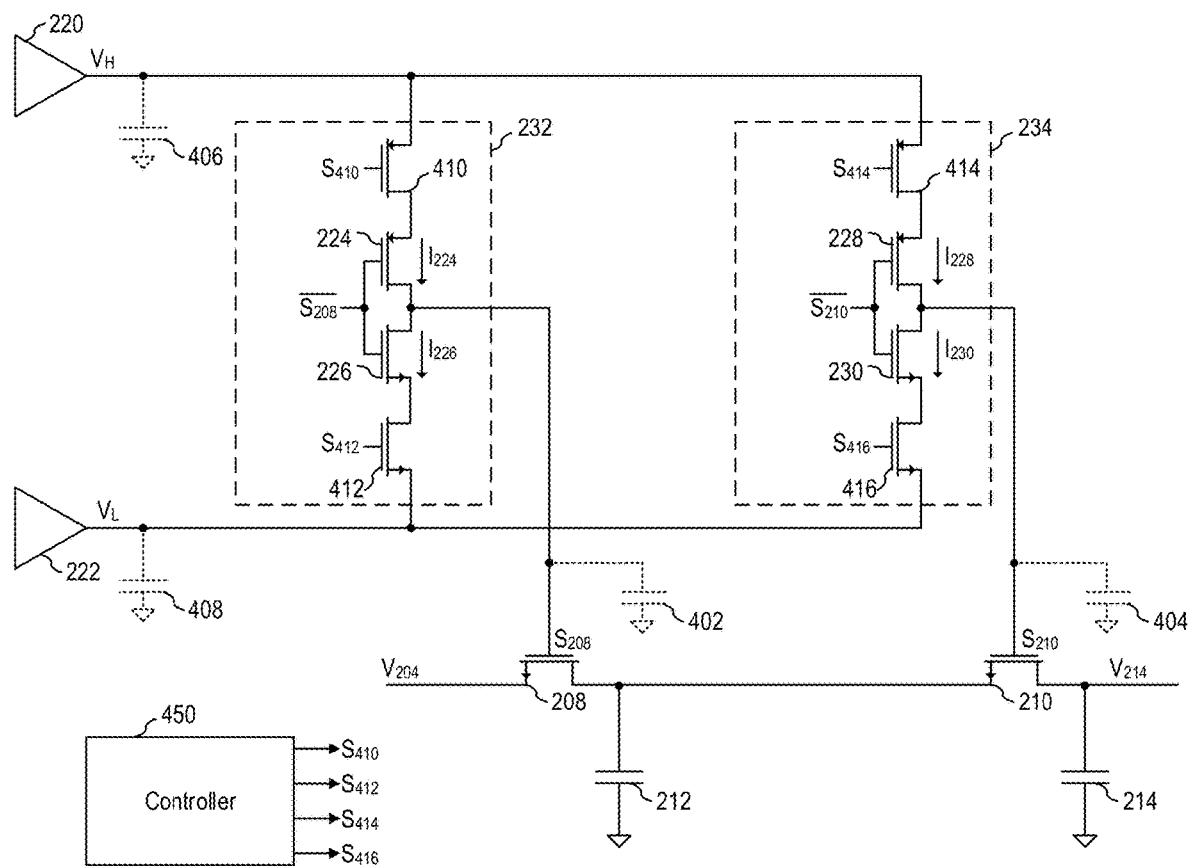
FIG. 4 shows a possible implementation of the gate drivers of FIG. 2B, according to an embodiment of the present invention.

FIG. 3 shows waveforms of signals $S_{208}$ and $S_{210}$ of pixel 200, according to an embodiment of the present invention. FIG. 4 shows a possible implementation of gate drivers 232 and 234, according to an embodiment of the present invention. FIG. 4 also illustrates parasitic capacitances 402, 404, 406, and 408.

In some embodiments, internal regulators 220 and 222 do not have external capacitors (external to the IC of CMOS image sensor 250). Capacitance 406 and 408, which may be a combination of parasitic capacitors and actual internal capacitors, or just parasitic capacitors, may be relatively small. For example, in some embodiments, capacitances 406 and 408 are in the order of pF, such as 50 pF, for example.

In rolling mode, a subset of all pixels 200 of CMOS image sensor 250 (e.g., a row) are simultaneously activated. Capacitances 402 and 404 of the activated pixels 200 may be in the order of pF, such as 1-3 pF, for example.

In global shutter mode, all pixels 200 of CMOS image sensor 250 are simultaneously activated. Depending on number of rows in global mode, capacitances 402 and 404 of the activated pixels 200 during global shutter mode may be larger than 100 times (such as 1000 times larger than) the capacitances 402 and 404 of pixels 200 during rolling mode. For example, in some embodiments, capacitances 402 and 404 may be in the order of nF, such as 2.4 nF.

In some embodiments, the aggregated capacitance 402 and 404 of the activated pixels 200 is at least 50 times higher than capacitances 406 and 408.

Figure 5:
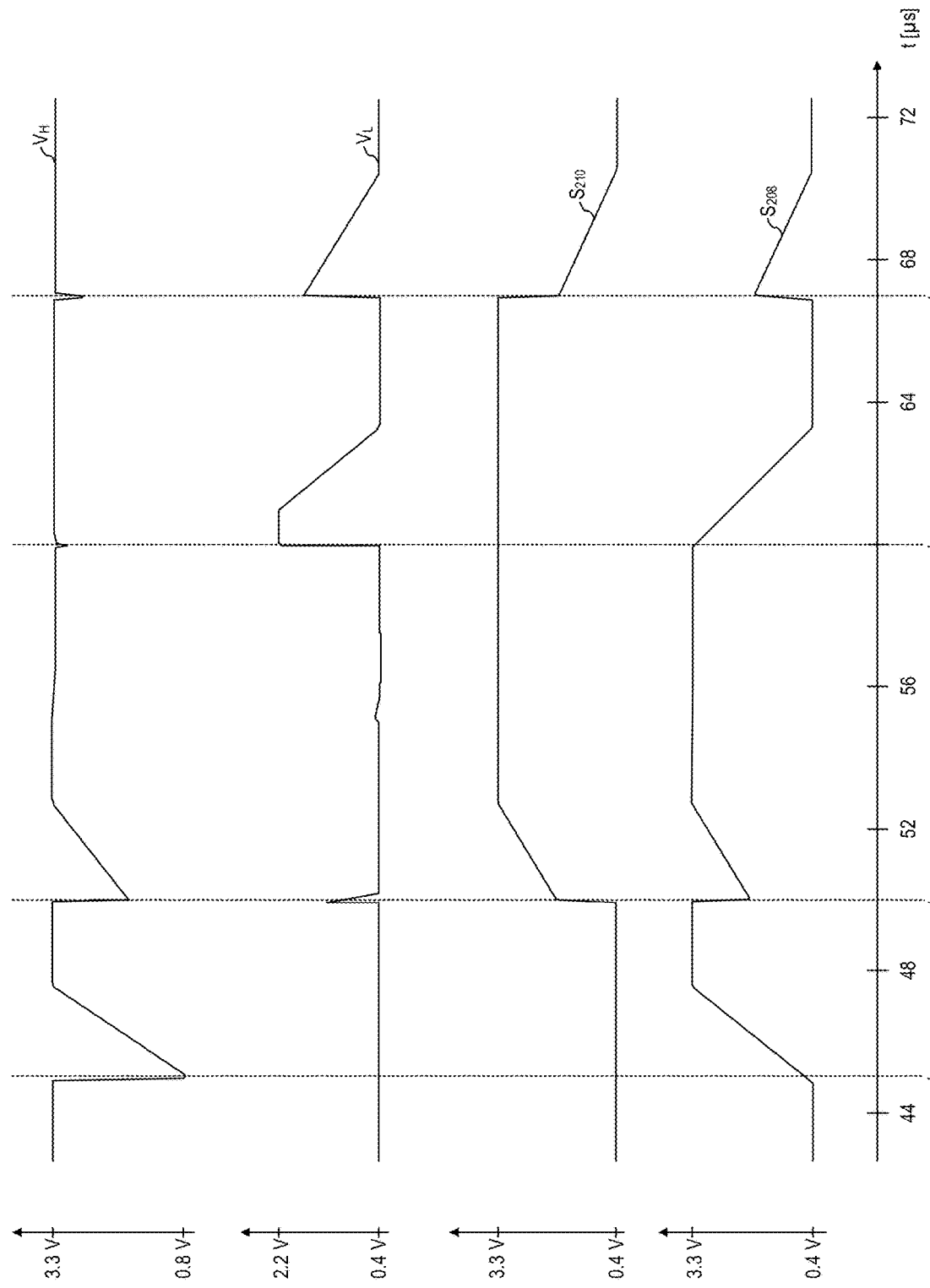
FIG. 5 shows possible waveforms of the voltage rails and of signals of a pixel of the CMOS sensor of FIGS. 2A and 2B without limiting currents in the gate driver of FIG. 4.

The inventors noted that during global shutter mode, it is possible that spikes occur in voltage rails $V_H$ and $V_L$ during transitions of storage control transistors 208 and 210 if currents $I_{224}$, $I_{226}$, $I_{228}$, and $I_{231}$, are not limited or controlled (e.g., due to charge transfer between capacitances 402 and 404, and capacitances 406 and 408, where capacitances 402 and 404 are bigger than capacitances 406 and 408). For example, FIG. 5 shows possible waveforms of high voltage rail $V_H$, low voltage rail $V_L$, and signals $S_{210}$ and $S_{208}$ during global shutter mode and without limiting currents $I_{224}$, $I_{226}$, $I_{228}$, and $I_{230}$. In the example shown in FIG. 5, voltage rails $V_H$ and $V_L$ have target values of 3.3 V and 0.4 V, respectively.

In some embodiments, LDO 220 and LDO 222 may be sized to be able to drive independently $S_{208}$ or $S_{210}$ and also to drive them simultaneously. In some embodiments, LDO sizing may be constrained by power consumption and silicon area. For independent control of $S_{208}$ and/or $S_{210}$, some embodiments advantageously avoid artifacts that may be caused by interference that may be created by interactions between LDOs 220 and 222 and signals $S_{208}$ and $S_{210}$ during independent control of signals $S_{208}$ and $S_{210}$ by controlling the slew rate of current flowing into the outputs of LDOs 220 and/or 222.

As shown in FIG. 5, when signal $S_{210}$ transitions from high to low at time $t_4$, a spike in low voltage rail $V_L$ is generated (e.g., by current $I_{230}$ flowing from capacitances 404 from all pixels 200) into capacitance 408. Such voltage spike in low voltage rail $V_L$ may be high enough to lift signal $S_{208}$ to turn on or partially turn on storage control transistor 208 at an undesirable time (e.g., at time $t_4$).

In an embodiment of the present inventions, a gate driver coupled to a voltage rail controls a gate of a storage control transistor, and the slew rate of current flowing from the gate of the storage control transistor into the voltage rail via the gate driver is controlled or limited during transitions of the storage control transistor, e.g., to reduce voltage spikes in the voltage rail.

In some embodiments, the slew rate of current flowing into or out of the voltage rail is controlled by adjusting the rdson of transistors coupled between the gate driver and the voltage rail. For example, as shown in FIG. 4, controller 450 controls the rdson (i.e., the on-resistance of the current path of the transistor) of transistors 412 and 416 using signals $S_{412}$ and $S_{416}$ to limit the current flow into low voltage rail $V_L$. In some embodiments, the initial current flowing into or out of the low voltage rail $V_L$ is proportional to the difference between the high voltage rail and low voltage rail ($V_H$–$V_L$) and inversely proportional to the rdson of transistors 412 and 416.

In some embodiments, the slew rate of current is limited based on the output capabilities of the regulator. For example, if regulator 222 has a maximum driving current of $I_{220}$, the slew rate of current flowing into capacitance 408 is limited so that to di/dt flowing into capacitance 408 does not exceed $I_{220}$.

Controller 450 may control the rdson of transistors 410 and 414 using signals $S_{410}$ and $S_{414}$ to limit the current flow into or out of high voltage rail $V_H$ in a similar manner.

In some embodiments, controller 450 is implemented inside each gate driver 232 and 234. Controller 450 may also be implemented outside gate drivers 232 and 234.

In some embodiments, controller 450 adjust the rdson of transistors 410, 412, 414, and 416 only during transitions of signals $S_{208}$ and $S_{210}$, while leaving transistors 410, 412, 414 and 416 fully on during the rest of the time. The transition time in which controller 450 adjusts the slew rate of current flowing into or out of voltage rails $V_L$ and $V_H$ may have a duration in the order of s, such as 3-5 μs, for example. A different duration may also be used.

In some embodiments, the slew rate control advantageously permits to share regulators for several control switches, which may advantageously reduce power consumption and/or silicon area.

Figure 6:
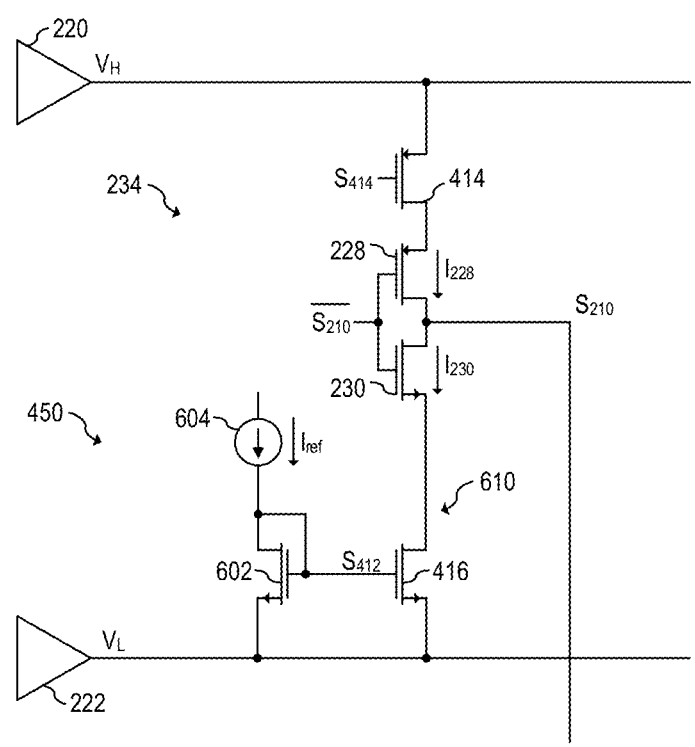
FIG. 6 shows a possible implementation of at least a portion of the controller of FIG. 4, according to an embodiment of the present invention.

FIG. 6 shows a possible implementation of controller 450 for controlling the slew rate of transistors 416, according to an embodiment of the present invention. It is understood that controller 450 may also implement a similar circuit for controlling the slew rate of transistors 410, 412, and 414.

During normal operation, reference current $I_{ref}$ may be set to a first value $I_{ref1}$ that fully turns on transistors 416. During transitions of signals $S_{210}$ and/or $S_{208}$, reference current $I_{ref}$ may be set to a second value $I_{ref2}$ that limits current $I_{230}$. The second value $I_{ref2}$ maybe set based on the value of voltage rails $V_H$ and $V_L$, as well as the capacitances 402, 404, 406, and 408. It is understood that the first and second values $I_{ref1}$ and $I_{ref2}$ may also be based on the ratio of current mirror 610.

In some embodiments, currents $I_{ref1}$ and $I_{ref2}$ may be generated by a single current source (e.g., by adjusting the magnitude of the current). In other embodiments, each of currents $I_{ref1}$ and $I_{ref2}$ is generated by a dedicated current source that is multiplexed based on the current to be injected into transistor 602. In yet other embodiments, currents $I_{ref1}$ and $I_{ref2}$ may be generated by changing the ratio of current mirror 610. Other implementations are also possible.

The inventors noted that in embodiments that implement both global shutter mode, e.g., for image acquisition and rolling mode, e.g., for image restitution, a slew rate control that prevents spikes in the voltage rails during global shutter mode may slow down operation during rolling mode, which may cause readout data errors.

In some embodiments, the slew rate control permits to reduce the regulator driving capability and consumption and to control the timing sequence independently for global shutter mode and rolling mode.

In an embodiment of the present invention, the slew rate control is based on the mode of operation of the CMOS image sensor (e.g., global shutter mode or rolling mode). For example, in some embodiments, the ratio of current mirror 610 is 1:1 during rolling mode, and is M:1 during global mode, where M is higher than 1, such as, e.g., 100. Other values (larger than 100 or smaller than 100) may also be used. In some embodiments, the value of M is based on the ratio of capacitance 402 and 404 during global shutter mode, and the capacitances 402 and 404 during rolling mode.

Figure 7:
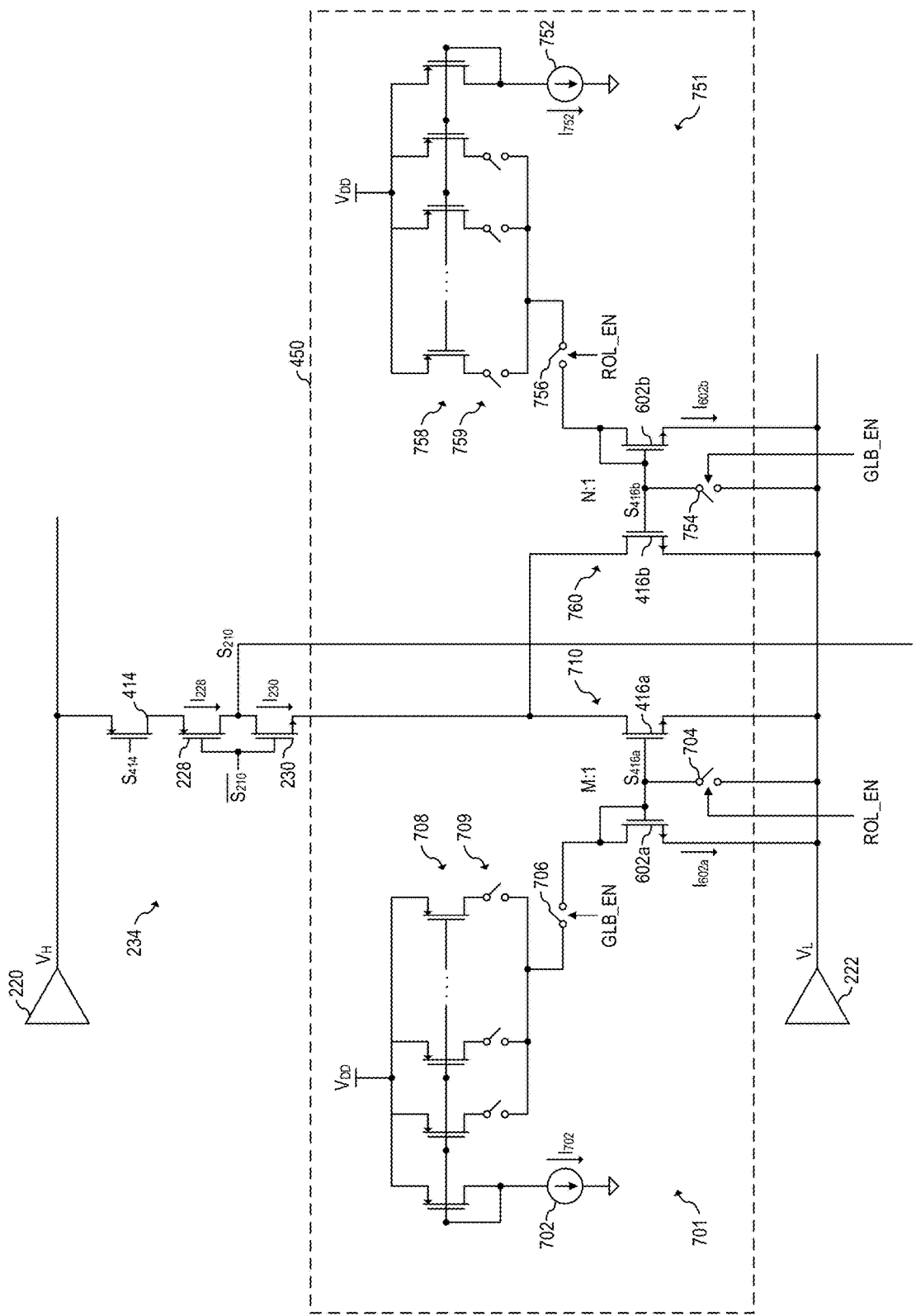
FIG. 7 shows a possible implementation of at least a portion of the controller of FIG. 4, according to an embodiment of the present invention.

FIG. 7 shows a possible implementation of controller 450 for controlling the slew rate of transistors 416, according to an embodiment of the present invention. It is understood that controller 450 may also implement a similar circuit for controlling the slew rate of transistors 410, 412, and 414.

During global shutter mode, signal GLB_EN is asserted (e.g., high) while signal ROL_EN is deasserted (e.g., low). During rolling mode, signal GLB_EN is deasserted (e.g., low) while signal ROL_EN is asserted (e.g., high).

As shown in FIG. 7, during global shutter mode, current mirror 710 is enabled (switch 704 is open, and switch 706 is closed) while current mirror 760 is disabled (switch 754 is closed and switch 756 is open).

In global shutter mode, current $I_{602a}$ may be generated to control the slew rate of current $I_{230}$, e.g., to avoid spikes in low voltage rail $V_L$ based on the value of reference current $I_{702}$, the number of transistors activated (e.g., using switches 709) from the plurality of transistors 708, and the value of M.

In rolling mode, current $I_{602b}$ may be generated to control the slew rate of current $I_{230}$, e.g., to avoid readout data errors (e.g., by allowing more current, and therefore, making the circuit faster when compared with global shutter mode) based on the value of reference current $I_{752}$, the number of transistors activated (e.g., using switches 759) from the plurality of transistors 758, and the value of N.

In some embodiments, N is equal to 1. In some embodiments, current $I_{702}$ may be bigger than current $I_{752}$. In some embodiments, switches 709 and 759 may be avoided. In some embodiments, switches 706 and 756 may be avoided (e.g., by enabling/disabling the plurality of transistors 708 and 758 in another way).

Switches 704, 706, 709, 754, 756, and 759 may be implemented in any way known in the art, such as, for example, by using MOSFETs.

As shown in FIG. 7, by having dedicated slew rate control circuits for global shutter mode (e.g., circuit 701) and rolling mode (e.g., 751), some embodiments advantageously avoid spikes in voltage rails during global shutter mode and avoid readout data errors during rolling mode while optimizing power consumption by sharing the internal regulators (e.g., 220 and 222). Some embodiments allow for the use of internal regulators (e.g., 220 and 222) that do not have an external compensation capacitor (output capacitor-free regulators), thereby advantageously reducing the number of pins of the image sensor and/or footprint in the PCB.

Figure 8:
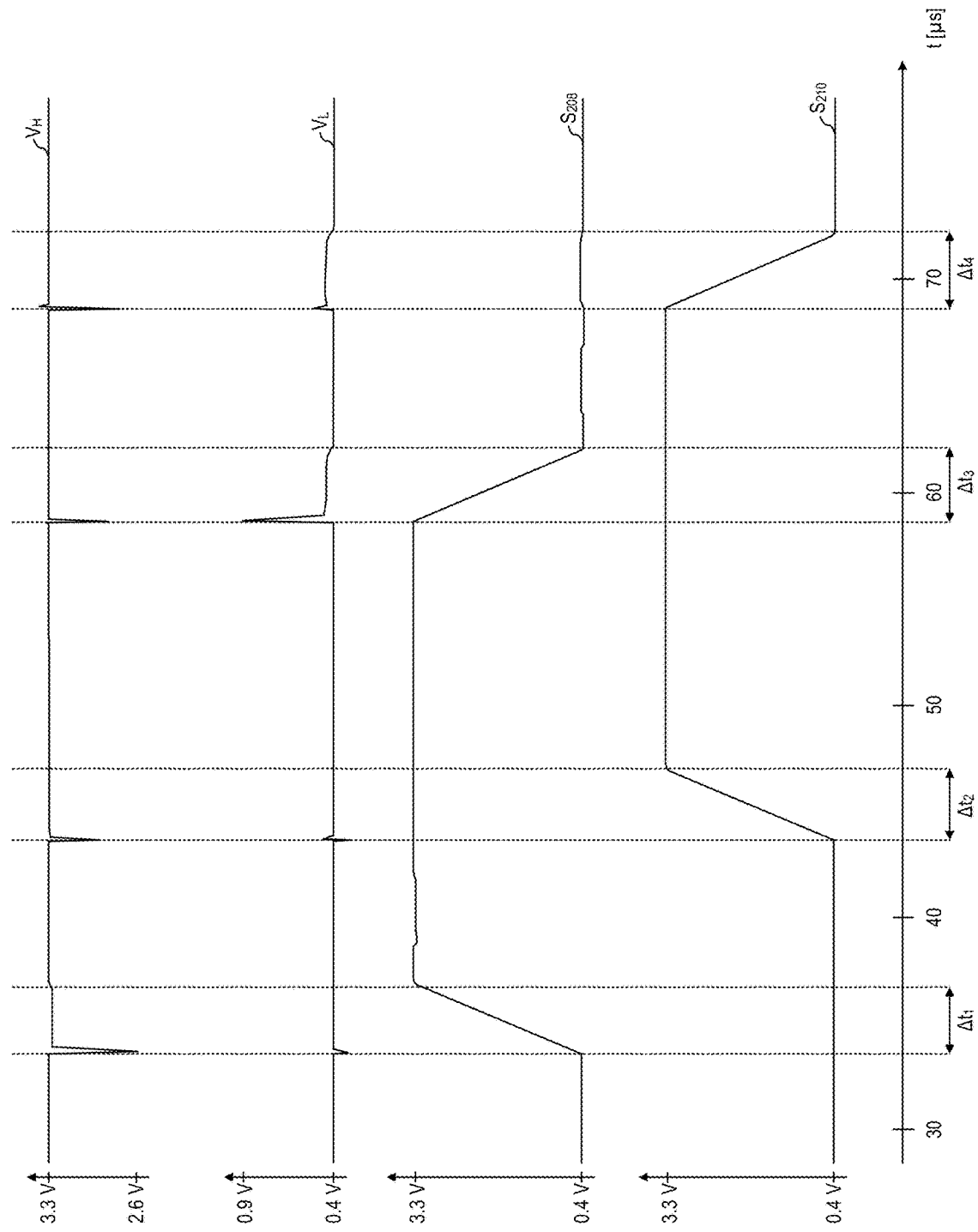
FIG. 8 shows waveforms of the voltage rails and signals of a pixel of the CMOS sensor of FIGS. 2A and 2B, as implemented as shown in FIG. 7, during global shutter mode, according to an embodiment of the present invention.

FIG. 8 shows waveforms of high voltage rail $V_H$, low voltage rail $V_L$, and signals $S_{210}$ and $S_{208}$ during global shutter mode, according to an embodiment of the present invention. The waveforms of FIG. 8 correspond to waveforms of a pixel 200 having controller 450 implemented as shown in FIG. 7.

As shown in FIG. 8, in some embodiments, controller 450 only applies slew rate control during times $\Delta t_1$ and $\Delta t_2$ (via transistors 410 and/or 414) and $\Delta t_3$ and $\Delta t_4$ (via transistors 412 and/or 416). In some embodiments, time $\Delta t_1$ is equal to time $\Delta t_2$ and time $\Delta t_3$ is equal to time $\Delta t_4$.

As shown in FIG. 8, the low frequency component of the spike (the frequency components that may couple into signal $S_{208}$) of low voltage rail $V_L$ during time $\Delta t_4$ does not exceed 50 mV (compared to about 1.35 V in FIG. 5), and the corresponding coupling of the spike into signal $S_{208}$ is advantageously smaller than the turn on threshold of transistor 208 (e.g., which may be 0.5-0.6V), and does not cause transistor 208 to turn on. As shown in FIG. 8, the low frequency component of the spike of high voltage rail $V_H$ during time $\Delta t_2$ does not exceed 50 mV (compared to about 2.5 V in FIG. 5).

Example embodiments of the present invention are summarized here. Other embodiments can also be understood from the entirety of the specification and the claims filed herein.

Example 1. An image sensor including: first and second voltage rails; a first regulator having an output coupled to the first voltage rail and configured to generate a first regulated voltage; a second regulator having an output coupled to the second voltage rail and configured to generate a second regulated voltage lower than the first regulated voltage; and a plurality of pixels coupled to the first and second voltage rails, where each pixel of the plurality of pixels includes: first and second storage capacitors, a first transistor having a current path coupled to the first storage capacitor, a second transistor having a current path coupled to the second storage capacitor, and a third transistor coupled between a control terminal of the first transistor and the first or second voltage rails, where the third transistor is configured to limit a slew rate of current flowing between the control terminal of the second transistor and the first or second voltage rails to a first slew rate when the image sensor operates in global shutter mode (e.g., for image acquisition), and to a second slew rate when the image sensor operates in rolling mode (e.g., for image readout), the first slew rate being smaller than the second slew rate.

Example 2. The image sensor of example 1, where the third transistor is configured to limit the slew rate of current between the control terminal of the second transistor and the first or second voltage rails to the first slew rate only during a transition of the first or second transistors from a first state to a second state.

Example 3. The image sensor of one of examples 1 or 2, where the first state is high and corresponds to the first regulated voltage, and where the second state is low and corresponds to the second regulated voltage.

Example 4. The image sensor of one of examples 1 to 3, where the third transistor is coupled between the control terminal of the second transistor and the second voltage rail.

Example 5. The image sensor of one of examples 1 to 4, where each pixel further includes a fourth transistor coupled between a control terminal of the first transistor and the first or second voltage rails, where the fourth transistor is configured to limit a slew rate of current flowing between the control terminal of the first transistor and the first or second voltage rails to the first slew rate when the image sensor operates in global shutter mode, and to the second slew rate when the image sensor operates in rolling mode, the first slew rate being smaller than the second slew rate.

Example 6. The image sensor of one of examples 1 to 5, where an aggregated capacitance of control terminals of each of the second transistors of activated pixels of the plurality of pixels is at least 100 times larger during global shutter mode than during rolling mode.

Example 7. The image sensor of one of examples 1 to 6, where an aggregated capacitance of control terminals of each of the second transistors of activated pixels of the plurality of pixels during global shutter mode is at least 50 times larger than a capacitance associated with the first or second voltage rail.

Example 8. The image sensor of one of examples 1 to 7, where each pixel further includes a first current mirror including the third transistor and a fourth transistor.

Example 9. The image sensor of one of examples 1 to 8, where the first current mirror has a ratio of M:1, where M is a positive integer greater than 1.

Example 10. The image sensor of one of examples 1 to 9, where M is 100.

Example 11. The image sensor of one of examples 1 to 10, each pixel further includes a second current mirror coupled between the control terminal of the second transistor and the first or second voltage rails, where the first current mirror is disabled during rolling mode, and where the second current mirror is disabled during global shutter mode.

Example 12. The image sensor of one of examples 1 to 11, where the second current mirror has a 1:1 ratio.

Example 13. The image sensor of one of examples 1 to 12, where the third transistor is coupled between the control terminal of the second transistor and the second voltage rail, and where each pixel further includes: a first switch coupled between the second voltage rail and a control terminal of the third transistor; and a second switch coupled between the second voltage rail and the second current mirror, where the first switch is configured to turn on during rolling mode, and where the second switch is configured to turn on during global shutter mode.

Example 14. The image sensor of one of examples 1 to 13, where each pixel further includes a pinned photodiode.

Example 15. The image sensor of one of examples 1 to 14, where each pixel further includes a fourth transistor having a control terminal coupled to the pinned photodiode, and a current patch coupled to a current path of the first transistor.

Example 16. A method including: generating a first voltage at a first voltage rail that is coupled to a plurality of pixels of an image sensor; generating a second voltage at a second voltage rail that is coupled to the plurality of pixels, where the second voltage is different than the first voltage; transitioning a first signal at a control terminal of a first transistor from the first voltage to the second voltage, where the first transistor has a current path coupled to a first storage capacitor; after transitioning the first signal from the first voltage to the second voltage, transitioning a second signal at a control terminal of a second transistor from the first voltage to the second voltage, where the second transistor has a current path coupled to a second storage capacitor; after transitioning the second signal from the first voltage to the second voltage, transitioning the second signal from the second voltage to the first voltage; and during the transition of the second signal from the second voltage to the first voltage, limit a slew rate of a current flowing between the control terminal of the first or second transistor and the first voltage rail to a first slew rate when the image sensor is in global shutter mode, and to a second slew rate when the image sensor is in rolling mode, where the first slew rate is smaller than the second slew rate.

Example 17. The method of example 16, where the first voltage is about 0.4 V and the second voltage is about 3.3 V.

Example 18. The method of one of examples 16 or 17, further including, after transitioning the second signal from the second voltage to the first voltage, transitioning the first signal from the second voltage to the first voltage.

Example 19. An integrated circuit including: a first internal LDO configured to generate a first regulated voltage at a first voltage rail, where the first internal LDO is not coupled to a compensation capacitor external to the integrated circuit; a second internal LDO configured to generate a second regulated voltage at a second voltage rail, where the second internal LDO is not coupled to a compensation capacitor external to the integrated circuit, and where the second regulated voltage is lower than the first regulated voltage; and an image sensor including a plurality of image sensor pixels arranged in rows and columns and coupled to the first and second voltage rails, where each image sensor pixel of the plurality of image sensor pixels includes: first and second storage capacitors, a first transistor having a current path coupled to the first storage capacitor, a second transistor having a current path coupled to the second storage capacitor, and a third transistor coupled between a control terminal of the first transistor and the second voltage rail, where the third transistor is configured to limit a slew rate of current flowing between the control terminal of the first transistor and the second voltage rail to a first slew rate when the image sensor operates in global shutter mode, and to a second slew rate when the image sensor operates in rolling mode, the first slew rate being smaller than the second slew rate.

Example 20. The integrated circuit of example 19, where the third transistor is configured to limit the slew rate of current between the control terminal of the second transistor and the second voltage rail to the first slew rate only during a transition of the second transistor from a first state to a second state, where the first state corresponds to the first regulated voltage, and where the second state corresponds to the second regulated voltage.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An image sensor comprising:
   first and second voltage rails;
   a first regulator having an output coupled to the first voltage rail and configured to generate a first regulated voltage;
   a second regulator having an output coupled to the second voltage rail and configured to generate a second regulated voltage lower than the first regulated voltage; and
   a plurality of pixels coupled to the first and second voltage rails, wherein each pixel of the plurality of pixels comprises:
      first and second storage capacitors,
      a first transistor having a current path coupled to the first storage capacitor,
      a second transistor having a current path coupled to the second storage capacitor, and
      a third transistor coupled between a control terminal of the first transistor and the first or second voltage rails, wherein the third transistor is configured to limit a slew rate of current flowing between the control terminal of the second transistor and the first or second voltage rails to a first slew rate when the image sensor operates in global shutter mode, and to a second slew rate when the image sensor operates in rolling mode, the first slew rate being smaller than the second slew rate.

2. The image sensor of claim 1, wherein the third transistor is configured to limit the slew rate of current between the control terminal of the second transistor and the first or second voltage rails to the first slew rate only during a transition of the first or second transistors from a first state to a second state.

3. The image sensor of claim 2, wherein the first state is high and corresponds to the first regulated voltage, and wherein the second state is low and corresponds to the second regulated voltage.

4. The image sensor of claim 1, wherein the third transistor is coupled between the control terminal of the second transistor and the second voltage rail.

5. The image sensor of claim 1, wherein each pixel further comprises a fourth transistor coupled between a control terminal of the first transistor and the first or second voltage rails, wherein the fourth transistor is configured to limit a slew rate of current flowing between the control terminal of the first transistor and the first or second voltage rails to the first slew rate when the image sensor operates in global shutter mode, and to the second slew rate when the image sensor operates in rolling mode, the first slew rate being smaller than the second slew rate.

6. The image sensor of claim 1, wherein an aggregated capacitance of control terminals of each of the second transistors of activated pixels of the plurality of pixels is at least 100 times larger during global shutter mode than during rolling mode.

7. The image sensor of claim 1, wherein an aggregated capacitance of control terminals of each of the second transistors of activated pixels of the plurality of pixels during global shutter mode is at least 50 times larger than a capacitance associated with the first or second voltage rail.

8. The image sensor of claim 1, wherein each pixel further comprises a first current mirror comprising the third transistor and a fourth transistor.

9. The image sensor of claim 8, wherein the first current mirror has a ratio of M:1, wherein M is a positive integer greater than 1.

10. The image sensor of claim 9, wherein M is 100.

11. The image sensor of claim 8, each pixel further comprises a second current mirror coupled between the control terminal of the second transistor and the first or second voltage rails, wherein the first current mirror is disabled during rolling mode, and wherein the second current mirror is disabled during global shutter mode.

12. The image sensor of claim 11, wherein the second current mirror has a 1:1 ratio.

13. The image sensor of claim 11, wherein the third transistor is coupled between the control terminal of the second transistor and the second voltage rail, and wherein each pixel further comprises:
  a first switch coupled between the second voltage rail and a control terminal of the third transistor; and
  a second switch coupled between the second voltage rail and the second current mirror, wherein the first switch is configured to turn on during rolling mode, and wherein the second switch is configured to turn on during global shutter mode.

14. The image sensor of claim 1, wherein each pixel further comprises a pinned photodiode.

15. The image sensor of claim 14, wherein each pixel further comprises a fourth transistor having a control terminal coupled to the pinned photodiode, and a current patch coupled to a current path of the first transistor.

16. A method comprising:
  generating a first voltage at a first voltage rail that is coupled to a plurality of pixels of an image sensor;
  generating a second voltage at a second voltage rail that is coupled to the plurality of pixels, wherein the second voltage is different than the first voltage;
  transitioning a first signal at a control terminal of a first transistor from the first voltage to the second voltage, wherein the first transistor has a current path coupled to a first storage capacitor;
  after transitioning the first signal from the first voltage to the second voltage, transitioning a second signal at a control terminal of a second transistor from the first voltage to the second voltage, wherein the second transistor has a current path coupled to a second storage capacitor;
  after transitioning the second signal from the first voltage to the second voltage, transitioning the second signal from the second voltage to the first voltage; and
  during the transition of the second signal from the second voltage to the first voltage, limit a slew rate of a current flowing between the control terminal of the first or second transistor and the first voltage rail to a first slew rate when the image sensor is in global shutter mode, and to a second slew rate when the image sensor is in rolling mode, wherein the first slew rate is smaller than the second slew rate.

17. The method of claim 16, wherein the first voltage is about 0.4 V and the second voltage is about 3.3 V.

18. The method of claim 16, further comprising, after transitioning the second signal from the second voltage to the first voltage, transitioning the first signal from the second voltage to the first voltage.

19. An integrated circuit comprising:
  a first internal LDO configured to generate a first regulated voltage at a first voltage rail, wherein the first internal LDO is not coupled to a compensation capacitor external to the integrated circuit;
  a second internal LDO configured to generate a second regulated voltage at a second voltage rail, wherein the second internal LDO is not coupled to a compensation capacitor external to the integrated circuit, and wherein the second regulated voltage is lower than the first regulated voltage; and
  an image sensor comprising a plurality of image sensor pixels arranged in rows and columns and coupled to the first and second voltage rails, wherein each image sensor pixel of the plurality of image sensor pixels comprises:
    first and second storage capacitors,
    a first transistor having a current path coupled to the first storage capacitor,
    a second transistor having a current path coupled to the second storage capacitor, and
    a third transistor coupled between a control terminal of the first transistor and the second voltage rail, wherein the third transistor is configured to limit a slew rate of current flowing between the control terminal of the first transistor and the second voltage rail to a first slew rate when the image sensor operates in global shutter mode, and to a second slew rate when the image sensor operates in rolling mode, the first slew rate being smaller than the second slew rate.

20. The integrated circuit of claim 19, wherein the third transistor is configured to limit the slew rate of current between the control terminal of the second transistor and the second voltage rail to the first slew rate only during a transition of the second transistor from a first state to a second state, wherein the first state corresponds to the first regulated voltage, and wherein the second state corresponds to the second regulated voltage.

* * * * *